United States Patent Office 2,870,118
Patented Jan. 20, 1959

2,870,118

PROCESS FOR POLYMERIZING ETHYLENIC ORGANIC COMPOUNDS WITH REDOX SYSTEM CATALYSTS IN THE PRESENCE OF BETAINE DERIVATIVES

Erich Bäder, Hanau (Main), and Otto Schweitzer, Konigstein (Taunus), Germany, assignors to Deutsche Gold- und Silber-Scheideanstalt vormals Roessler, Frankfurt am Main, Germany No Drawing. Application February 21, 1956
Serial No. 566,778

Claims priority, application Germany February 22, 1955

7 Claims. (Cl. 260—45.5)

The present invention relates to an improved process of preparing polymers by catalytic polymerization of polymerizable compounds containing terminal or centrally located double bonds between two carbon atoms, that is, compounds containing a $>C=C<$ group, and more particularly to an improved process of preparing such polymers with Redox system catalysts.

The polymerization of compounds containing a $>C=C<$ group, such as styrene, its derivatives, acrylic acid, methacrylic acid or their esters, vinyl compounds, acrylonitrile, butadiene, chlorobutadiene, dimethylbutadiene and the like, either alone or in combination, has already been carried out under many varying conditions. For example, the polymerization of such compounds can be carried out in solutions, in emulsions or in bulk. For many purposes, it is advantageous to employ a system in which a solution or a suspension of a high molecular weight polymer in a polymerizable monomer is polymerized. Such systems, for example, can be used with good success in dentistry.

It is furthermore known to employ compounds or combinations of compounds of Redox systems as catalysts.. In many instances, combinations have proved successful which contain oxygen, preferably in the form of a peroxide, and amines or their salts, preferably their hydrohalides, such as their hydrochlorides.

It has also been proposed to employ quaternary ammonium compounds and other onium compounds as polymerization accelerators in combination with peroxides and organic sulfur compounds, such as sulfinic acids or their salts, α-oxysulfones, sulfoxylates, α-aminosulfones, thioethers, which preferably are substituted by a hetero atom, such as nitrogen in α position, or mercaptans with the simultaneous presence of labile bound halogen or also small quantities of heavy metal compounds and/or mono or polyvalent aliphatic alcohols and/or small quantities of water.

According to the invention, it was unexpectedly found that the action of polymerization catalysts, especially Redox-system catalysts, is substantially improved by the addition of betaine compounds which are obtained by splitting the betaine ring. The betaine compounds employed according to the invention have the following general formula:

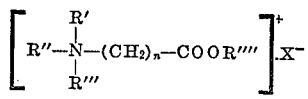

in which R′, R″ and R‴ represent an aliphatic, aromatic, hydroaromatic or heterocyclic radical, R″″ represents hydrogen or an aliphatic, aromatic, hydroaromatic or heterocyclic radical, X represents an acid radical (anion) and $n$ represents an integer preferably from 1 to 4.

It was furthermore found that those betaine derivatives which are soluble in the quantity to be employed in the monomer to be polymerized are especially active. Of such soluble betaine derivatives, the trialkyl amino acetic acid ester chlorides or aralkyl-dialkyl amino acetic acid ester chlorides in which the aryl group is separated from the amino nitrogen atom by at least two —$CH_2$— groups have been found particularly suitable for the purposes of the invention. Phenyl ethyl dibutyl amino acetic acid ethyl ester chloride of the following formula is an example of such a betaine derivative:

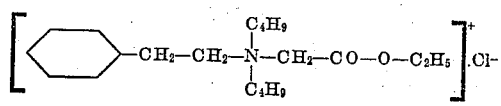

The chlorine ion can, for example, be replaced by other anions, such as sulfate radical, phosphate radical or sulfinic acid or sulfinic acid derivative radicals.

The action of the betaine compounds employed according to the invention can be still further improved by the addition of small amounts of heavy metal compounds, such as copper, manganese, cobalt and lead compounds, and/or mono or polyhydric aliphatic alcohols.

It furthermore has been found that in many instances the presence of a small quantity of water substantially accelerates the polymerization.

The process according to the invention can be used with particular advantage in bulk polymerization. The temperatures to be employed can be held relatively low and in most instances the polymerization can be carried out at room temperature and below. In some instances the polymerization can also be accelerated by heating.

In carrying out a bulk polymerization according to the invention, it is expedient to employ as a starting material a mixture or solution which contains at least one polymerizable liquid monomer and at least one polymeric compound.

In order to stabilize the monomeric component of the starting material, it has been found expedient to add small quantities of polyester resins, for example, reaction products of maleic acid or fumaric acid with diols, which are soluble in the monomeric component.

The catalyst combinations according to the invention have proved to be especially adapted for the production of dental preparations, for example, for the production of prostheses, dental fillings, prostheses repairs, as well as for other technical uses, such as spachtelling masses, adhesives or reaction lacquers. They are well adapted for use in combination with monomeric methyl methacrylate and powdered polymerized methyl methacrylate, but their use is in no way limited thereto.

The polymerization systems according to the invention, especially for dental application, are marked by their especially rapid and complete polymerization, even in very thin layers, and excellent surface hardness of the resulting polymerized product. Furthermore, the polymerized products have high color stability and consequently in this respect fulfill the high requirements which are now met with. In addition to fillers, such as fiber material and glass filaments, the polymerizable systems according to the invention can also contain the usual pigments.

For dental applications, polymerizable systems containing solid components and liquid monomers, it is expedient to mix the Redox system catalyst, such as the peroxide and a derivative of α-oxysulfone, with the powdered components and to dissolve the betaine compound in the monomer. The monomeric methyl methacrylate can also contain the usual stabilizers.

The following examples will serve to illustrate several modifications according to the invention:

Example 1

0.6 cc. of monomeric methyl methacrylate containing 0.5% of a betaine derivative of the formula $$[(C_2H_5)_3NCH_2COOC_2H_5]Cl$$

and 2% of methanol, as well as 10γ of copper per cc. (as naphthenate), was mixed with 1 gram of powdered polymeric methyl methacrylate which had previously been admixed with 2% of p-tolyl sulfinic acid and 1% of benzoyl peroxide. The resulting mass hardened in a vessel having a 25 mm. diameter upon standing 11 minutes.

Example 2

0.6 cc. of monomeric methyl methacrylate containing 0.4% of a betaine derivative of the formula $$[C_6H_5C_2H_4N(C_4H_9)_2CH_2COOC_2H_5]Cl$$

1.5% of 1,2-propylene glycol and 30γ copper (as naphthenate) was mixed with 1 gram of powdered polymeric methyl methacrylate admixed with 1% of an α substituted thioether of the formula $CH_3C_6H_4SCH_2$-piperidyl and 0.5% of benzoyl peroxide.

The resulting mass hardened upon standing 16 minutes in a vessel having a 25 mm. diameter.

Example 3

0.6 cc. of monomeric methyl methacrylate containing 0.5% of a betaine derivative of the formula $$[C_6H_5C_2H_4N(C_4H_9)_2CH_2COOC_2H_5]Cl$$

2% of 1,3-butylene glycol, 5% of acrylic acid, as well as 10γ of copper per cc. (as naphthenate), was mixed with 1 gram of powdered polymeric methyl methacrylate admixed with 2% of dodecylmercaptan and 1% of lauryl peroxide.

The resulting mass hardened upon standing 9 minutes in a vessel of 25 mm. diameter.

Example 4

0.6 cc. of monomeric methyl methacrylate containing 0.5% of a betaine derivative of the formula $$[(C_2H_5)_3NCH_2COOC_2H_5]Cl$$

2% of methanol, 1.5% of an unsaturated polyester resin produced from maleic acid anhydride and ethylene glycol, as well as 10γ copper (as naphthenate) per cc., was mixed with 1 gram of powdered polymeric methyl methacrylate admixed with 2% of an α-aminosulfone of the formula $(CH_3C_6H_4SO_2CH_2)_2NC_2H_5$ and 1% of dichlorobenzoyl peroxide.

The resulting mass hardened upon standing 9 minutes in a vessel having a 25 mm. diameter.

Example 5

Several grams of a polymerizable mixture containing 62% of an unsaturated polyester resin produced from maleic anhydride and ethylene glycol, 33% of monostyrene and 5% of acrylic acid were mixed with 0.3% of a betaine derivative of the formula $$[C_6H_5C_2H_4N(C_4H_9)_2CH_2COOC_2H_5]Cl$$

10γ copper (as naphthenate) per cc., 2% of an α-aminosulfone of the formula $(CH_3C_6H_4SO_2CH_2)_2NC_2H_5$, 1% of cumene hydroperoxide and the mass permitted to polymerize in a vessel 15 mm. in diameter. The mass hardened upon standing one and three-quarters minutes.

We claim:

1. In the preparation of a polymer by catalytic polymerization of a polymerizable mass comprising at least one polymerizable compound containing a $>C=CH_2$ group with a catalytic amount of a Redox system catalyst containing at least one peroxide compound and at least one organic sulfur containing compound selected from the group consisting of sulfinic acid compounds, α-oxysulfones, thioethers and mercaptans, the step which comprises conducting the polymerization of said mass in the presence of a catalytic amount of a betaine derivative which is soluble in said polymerizable compound and which is of the formula $$\left[ R''-\underset{R'''}{\overset{R'}{N}}-(CH_2)_n-COOR'''' \right]_x X$$

wherein R', R'', R''' represent a radical selected from the group consisting of alkyl and aryl radicals, R'''' represents a radical selected from the group consisting of hydrogen, alkyl and aryl radicals, n is an integer from 1 to 4 and X is an inorganic acidic anion.

2. The process of claim 1 in which said betaine derivative is a trialkyl amino acetic acid ester chloride.

3. The process of claim 1 in which said betaine derivative is an aralkyl dialkyl amino acetic acid ester chloride in which the alkyl group of aralkyl group contains at least 2 —$CH_2$— groups.

4. The process of claim 1 in which said polymerizable mass contains a relatively small catalytic quantity of a lower aliphatic alcohol.

5. The process of claim 1 in which said polymerizable mass contains a relatively small catalytic quantity of water.

6. The process of claim 1 in which said polymerization is carried out in bulk.

7. The process of claim 1 in which said polymerizable organic compound is a liquid monomer containing a $>C=CH_2$ group and said polymerizable mass also contains a polymeric compound obtained by the polymerization of at least one organic compound containing a $>C=CH_2$ group.

References Cited in the file of this patent

UNITED STATES PATENTS 2,740,765    Parker _____ Apr. 3, 1956

FOREIGN PATENTS 318,115    Great Britain _____ Aug. 26, 1929